United States Patent [19]
Brune et al.

[11] Patent Number: 6,139,143
[45] Date of Patent: Oct. 31, 2000

[54] TEMPLE FOR EYEWEAR HAVING AN INTEGRALLY FORMED SERPENTINE HINGE

[75] Inventors: Henri Brune, Lentilly, France; Richard L. Brhel, Rochester, N.Y.

[73] Assignee: Bausch & Lomb Incorporated, Rochester, N.Y.

[21] Appl. No.: 08/989,019

[22] Filed: Dec. 11, 1997

[51] Int. Cl.[7] ................................................. G02C 5/22
[52] U.S. Cl. ............................ 351/153; 351/111; 16/228
[58] Field of Search ................................... 351/111, 153, 351/140, 113, 114, 41; 16/228

[56] References Cited

U.S. PATENT DOCUMENTS

| | | | |
|---|---|---|---|
| 2,746,087 | 5/1956 | Dolezal | 18/48 |
| 3,395,964 | 8/1968 | Neider | 351/63 |
| 3,756,704 | 9/1973 | Marks | 351/60 |
| 4,472,035 | 9/1984 | Takamura | 351/41 |
| 4,772,112 | 9/1988 | Zider | 351/41 |
| 4,896,955 | 1/1990 | Zider | 351/41 |
| 4,983,029 | 1/1991 | Sato | 351/41 |

FOREIGN PATENT DOCUMENTS

| | | | |
|---|---|---|---|
| 0450224A3 | 9/1991 | European Pat. Off. | G02C 5/00 |
| 473300 | 6/1947 | France . | |
| 2577469 | 8/1986 | France . | |
| 29607380 U1 | 1/1997 | Germany | G02C 5/10 |
| 56-4117 | 1/1981 | Japan | G02C 5/16 |
| 779472 | 7/1957 | United Kingdom | 97/1 |
| 871540 | 6/1961 | United Kingdom | 97/1 |
| 1108209 | 12/1966 | United Kingdom | G02C 5/22 |
| WO 93/18429 | 9/1993 | WIPO | G02C 5/00 |

*Primary Examiner*—Hung Xuan Dang
*Attorney, Agent, or Firm*—Arent Fox Kintner Plotkin & Kahn PLLC

[57] ABSTRACT

A hingeless temple for eyewear comprises a unitary length of flexible material such as a shape-memory metal or metal alloy which has a forward section, an elongated section and a flexible pivot section between the forward and elongated sections. The pivot section is characterized by three bends which form a generally serpentine configuration. In the unbiased position, the temple extends in the open position with respect to the eyewear front. Means are provided for selectively and releasably closing the temple in the folded position with respect to the eyewear front. When the closing means are released, the temple automatically pivots to the open position. The front end of the temple may be attached directly to the eyewear front, thereby negating the need for a separate hinge assembly.

5 Claims, 3 Drawing Sheets

TEMPLE FOR EYEWEAR HAVING AN INTEGRALLY FORMED SERPENTINE HINGE

BACKGROUND OF THE INVENTION

The present invention relates to eyewear, and more particularly relates to a temple for eyewear which includes an integrally formed hinge adjacent to the front end thereof such that the temple front end may pivot with respect to an eyewear front without requiring a separate hinge assembly.

Hingeless temples for eyewear have previously been proposed. For example, in U.S. Pat. No. 2,746,087 issued to Dolezal on May 22, 1956, a plastic temple 3 is attached to a front having eyewires 1 by a cold worked hinge area 4 (FIGS. 1–5), 5 (FIGS. 8 and 9), and 18 (FIGS. 10 and 12) which may be made as an extension of the temple itself. In this patent, the plastic temple is subjected to cold working by pressing or rolling the plastic, for example, to change its molecular orientation at the hinge area to thereby provide this area some degree of flexibility. It is likely, however, that this temple would be extremely fragile and break upon the repeated opening and closing of the temple. One of the major challenges to designing a hingeless temple is thus being able to withstand the high stress and strain imparted by repeated opening and closing of the temple with respect to the eyewear front.

SUMMARY OF THE INVENTION

The present invention provides a hingeless temple which achieves a unique synergy between material and design such that the temple exhibits an extremely strong resistance to stress and strain despite repeated open and closing cycles typical of eyewear use. More particularly, the present invention provides a temple which has an elongated member which is formed from a flexible material, preferably a shape-memory alloy such as NiTi. The temple is formed at the forward end thereof into a configuration which affords the pivotal movement capabilities to the temple without the need for a separate hinge assembly. The specific configuration is characterized by three separate curved bends formed in the forward end of the temple piece with the middle bend being in the opposite direction as the outer bends, thereby generating a somewhat serpentine appearance at this location which is aesthetically as well as operationally superior to prior hingeless designs. In the preferred embodiment, each pivot bend in the temple is formed as part of a circle of substantially the same diameter such that each bend is of substantially the same radius of curvature.

In the unbiased condition of the temple, the temple extends in the open position with respect to the eyewear front to which it attaches. The temple is easily pivoted laterally outwardly a small distance to place and fit the eyewear on the head in a snug, comfortable manner. Upon removing the eyewear, the temple may be folded against the back of the eyewear front. Means are provided to latch each temple in the folded position against the eyewear front when not in use. When the latch is released, the temples automatically pivot to their unbiased, normally open position.

BRIEF DESCRIPTION OF THE DRAWINGS

FIG. 5b is an exploded, front elevational view of a lens (fragmented) and the attachment piece and front end of the temple seen in FIG. 5a.

DETAILED DESCRIPTION

Figure 1:
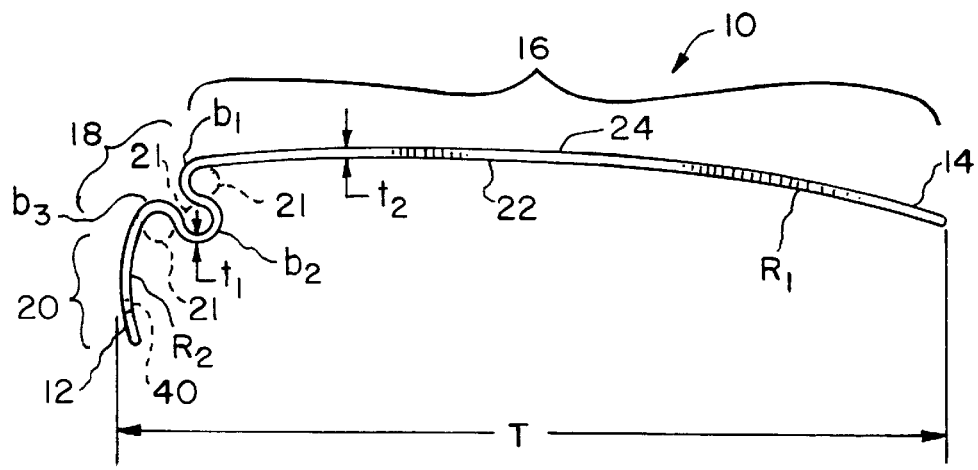
FIG. 1 is a top plan view of the temple of the invention.

Referring now to the drawing, there is seen in the various Figures a temple 10 comprising an elongated member having opposite front and back ends 12 and 14, respectively. Temple 10 includes three basic sections; an elongated section 16 having back end 14, a flexible pivot section 18, and a forward section 20 having front end 12. In the unbiased condition of temple 10 seen in FIG. 1, elongated section 16 extends generally perpendicularly to forward section 20. At least forward section 20 and pivot section 18 are formed from a flexible material, although it is preferred that the entire length of temple 10, including elongated section 16, be formed from a single, unitary length of flexible material such as plastic or metal which may be formed into an elongated work piece by any appropriate means (e.g., molded, extruded, or rolled). However, in the preferred embodiment, the entire length of temple 10 is formed from a ribbon of a shape-memory metal or metal alloy such as pure Titanium or NiTi, for example.

The pivot section 18 is characterized by three bends $b_1$, $b_2$, and $b_3$ which may be formed by bending a flattened ribbon of the material around three spaced metal pins 21 fixed to a steel plate (not shown). The middle bend $b_2$ is in the opposite direction than bends $b_1$ and $b_3$ such that pivot section 18 appears in a generally serpentine configuration.

Temple 10 has opposite inner and outer surfaces 22 and 24 which face toward and away from the head, respectively, when the temple 10 is attached to an eyewear front 26 (FIGS. 2–4) and the eyewear is worn. Beginning from elongated section 16, bend $b_1$ extends toward inner surface 22, bend $b_2$ extends toward outer surface 24, and bend $b_3$ extends back toward inner surface 22. In the preferred embodiment, each bend $b_1$–$b_3$ is of substantially the same radius of curvature. Preferred dimensions for temple 10 are as follows:

Total length T of temple: 4.65"
Radius $R_1$ at elongated section 16 adjacent back end 14: 15.0"
Radius $R_2$ at front section 20 adjacent front end 12: 1.0"
Radius of each bend $b_1$–$b_3$ at pivot section 18: 0.19"
Thickness $t_1$ of material at pivot section 18: 0.025"
Thickness of material $t_2$ at elongated and front sections 16 and 20: 0.040"
Height of material h: 0.125"–0.140"

Figure 3:
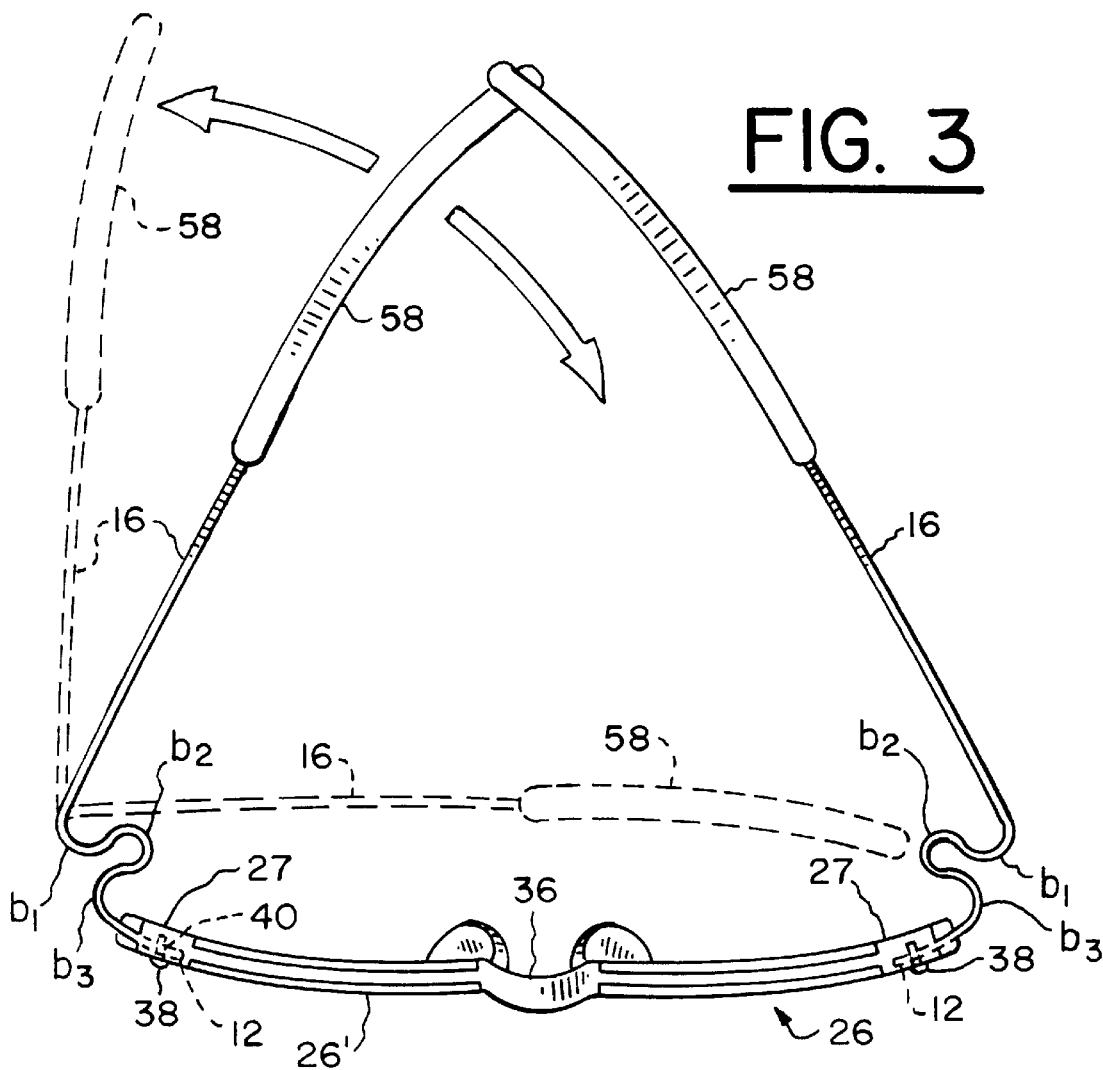
FIG. 3 is a top plan view of an eyewear having two temples in accordance with the invention.
Figure 4:
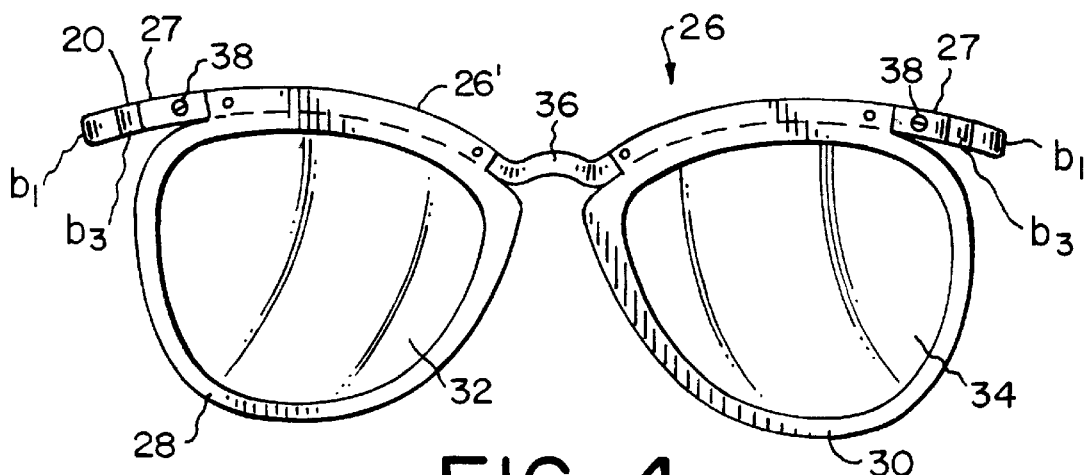
FIG. 4 is a front, elevational view of the eyewear of FIG. 3.
Figure 5A:
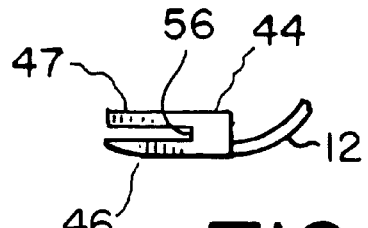
FIG. 5a is a plan view of the front end of the temple attached to a separate lens attachment piece.
Figure 5B:
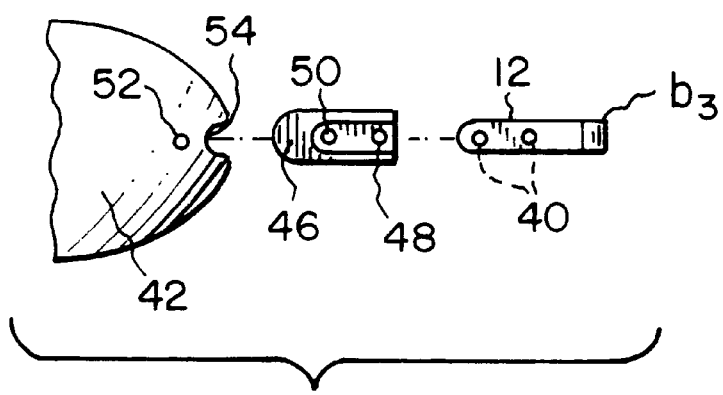

Temple 10 may be attached to any type of eyewear front, such as a front 26 seen in FIGS. 3 and 4 having separate frame eyes 28 and 30 which capture lenses 32 and 34 therein, respectively, joined by a bridge 36. A brow bar 26' includes slotted lateral end pieces 27 in which temple front end 12 may be secured with one or more rivets or pins 38 passed through holes 40 formed in front portion 20. As seen in FIG. 5, temple 10 may be attached to a frameless lens 42 via a slotted connecting element 44, with end 12 being secured in hollow prong 46 by a pin 48, and piece 44 being secured to lens 42 by a second pin 50 passing through an aperture 52 formed in lens 42. The lens 42 is sandwiched between prongs 46 and 47, with the edge of a notch 54, previously cut in a lateral end portion of lens 42, abutting the juncture wall 56 of prongs 46 and 47. Other attachment means are of course possible (e.g., cementing, soldering, etc.) and the invention is therefore not limited to the attachment means shown and described herein.

Figure 2:
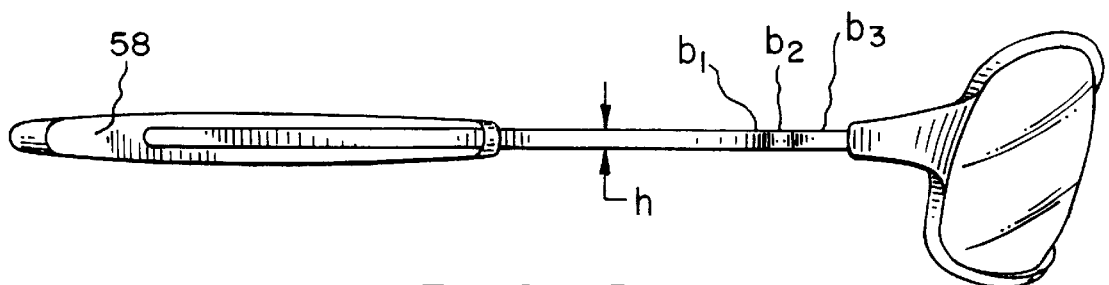
FIG. 2 is a side, elevational view of the temple shown attached to an eyewear front with an auxiliary temple end piece fitted to the back end of the temple.

Referring to FIGS. 2 and 3, temple 10 is shown in solid lines in its normally open, unbiased position with respect to eyewear front 26. Any temple end piece may be attached to elongated portion 16 as desired, for example an elastomeric temple boot 58. Temple 10 has been formed such that its unbiased position is close to perpendicular to the eyewear front. Thus, to put the eyewear on the head, the user need only open the temple 10 to the position seen in dotted lines to the left in FIG. 3. The effort this requires is very minimal, and as such will bias the temple toward the side of the head to provide a snug yet comfortable fit when the eyewear is worn.

Figure 6:
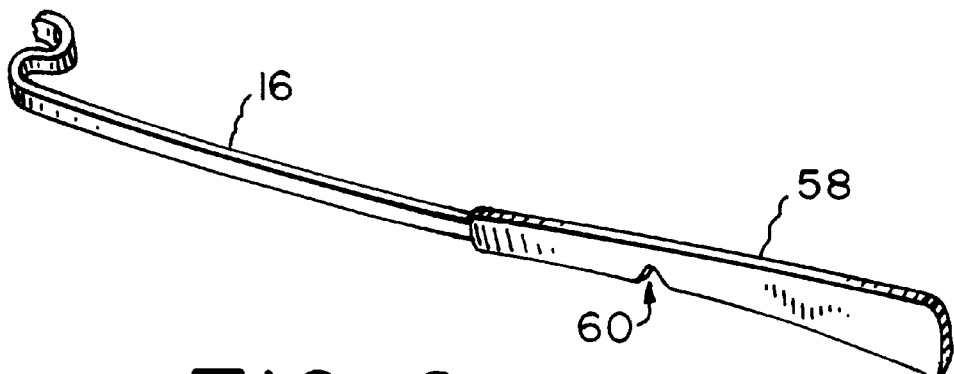
FIG. 6 is a fragmented, perspective view of a temple tip showing one possible method for releasably retaining the temples of the invention in the folded position when not in use.

Upon removing the eyewear, the temples may be easily pivoted to their folded position seen in dotted lines to the right in FIG. 3. In this regard, it is intended that some type of means are provided to releasably secure the temples in the folded position. The temple retention means could simply be an eyewear case (not shown) into which the eyewear is placed when not in use. In this instance, the walls of the case itself would retain the temples in the folded state until the eyewear is removed from the case. Alternatively, some type of positive retention means, either separate from or attached to the eyewear itself, could be provided to maintain the temples in the folded position when not in use. The retention means could be any type of clasp, catch or detent, for example, located on any part of the eyewear including the temples and/or frame. One type of simple latching means is shown in FIG. 6 in the form of a notch 60 which is cut or otherwise formed in temple boot 58 and wherein an edge of the other temple end may be inserted and retained thereby. The other temple may or may not have a notch itself which would mate with the notch on the temple in FIG. 6. Upon manually releasing the temple from the notch, both temples will automatically pivot to their open, unbiased position. Other types of temple retention means are of course possible, and the invention is therefore not limited to the means described and shown herein.

What is claimed is:

1. An eyewear temple for attachment to an eyewear front, said temple comprising an elongate member having opposite front and back ends and opposite inner and outer surfaces, said temple having a flexible pivot section formed adjacent said front end, said pivot section including consecutive first, second and third bends of substantially similar radius to form a generally serpentine configuration, said first bend being closest to said back end and said third bend being closest to said front end, said first bend curving inwardly toward said inner surfaces, said second bend curving inwardly and then outwardly back toward said outer surface, and said third bend curving outwardly back toward said inner surface in the direction of said front end, and said elongate member including means thereon for said selectively and releasably retaining said temple in a folded relationship with respect to said eyewear front when mounted thereto.

2. The temple of claim 1 wherein said material is a shape-memory metal.

3. The temple of claim 1 wherein said metal is an alloy comprising NiTi.

4. The temple of claim 1 wherein said temple includes a forward section and elongated section including said front and back ends, respectively, with said pivot section extending between said forward section and said elongated section, and wherein said elongated section extends generally perpendicular to said forward section in the unbiased condition of said temple.

5. The temple of claim 1 wherein said temple is formed from a continuous length of NiTi ribbon.

\* \* \* \* \*

UNITED STATES PATENT AND TRADEMARK OFFICE
CERTIFICATE OF CORRECTION

PATENT NO. : 6,139,143
DATED      : October 31, 2000
INVENTOR(S) : Brune, et. al.

It is certified that error appears in the above-identified patent and that said Letters Patent is hereby corrected as shown below:

Assignee:  Luxottica Leasing S.p.A.

Signed and Sealed this

Twenty-second Day of May, 2001

Attest:

NICHOLAS P. GODICI

Attesting Officer    Acting Director of the United States Patent and Trademark Office